(12) United States Patent
Salgado

(10) Patent No.: US 11,308,465 B2
(45) Date of Patent: Apr. 19, 2022

(54) METHOD FOR PROGRAMMING BANKING DATA IN AN INTEGRATED CIRCUIT OF A WATCH

(71) Applicant: EM Microelectronic-Marin S.A., Marin (CH)

(72) Inventor: Stephanie Salgado, La Neuveville (CH)

(73) Assignee: EM Microelectronic-Marin S.A., Marin (CH)

( * ) Notice: Subject to any disclaimer, the term of this patent is extended or adjusted under 35 U.S.C. 154(b) by 497 days.

(21) Appl. No.: 15/175,628

(22) Filed: Jun. 7, 2016

(65) Prior Publication Data

US 2016/0364704 A1 Dec. 15, 2016

(30) Foreign Application Priority Data

Jun. 12, 2015 (EP) .................................. 15171811

(51) Int. Cl.
*G06Q 20/10* (2012.01)
*G06Q 20/36* (2012.01)
(Continued)

(52) U.S. Cl.
CPC ....... *G06Q 20/108* (2013.01); *G06Q 20/3223* (2013.01); *G06Q 20/3226* (2013.01);
(Continued)

(58) Field of Classification Search
None
See application file for complete search history.

(56) References Cited

U.S. PATENT DOCUMENTS 5,623,637 A * 4/1997 Jones ................. G06F 12/1466
710/13
5,745,574 A * 4/1998 Muftic ................. H04L 9/3268
713/157
(Continued)

FOREIGN PATENT DOCUMENTS

CH 699083 A2 * 1/2010 ........... G06Q 20/389
EP 0807911 A2 * 11/1997 ........... H04L 9/0841
(Continued)

OTHER PUBLICATIONS

Bruce Schneier, Applied Cryptography Jan. 1, 1996, John Wiley & Sons, pp. 16; 252-276; 747-790.*
(Continued)

*Primary Examiner* — Jacob C. Coppola
(74) *Attorney, Agent, or Firm* — Oblon, McClelland, Maier & Neustadt, L.L.P.

(57) ABSTRACT

The method enables banking data to be programmed in an integrated circuit of a watch by an asymmetric encryption and decryption algorithm. The method includes the steps of:
  transmitting a public key of the integrated circuit and a digital certificate generated by a certification authority on the basis of a private key of the certification authority and of the integrated circuit public key, from the portable object to a bank,
  verifying the digital certificate in the bank by a public key of the authority, and if the digital certificate is validated,
  transmitting encrypted confidential data personalized to an owner of the portable object from the bank to the portable object, and
  decrypting the encrypted data received by the application-specific integrated circuit of the portable object by
(Continued)

means of a private key of the integrated circuit, to store the decrypted confidential data personalized to the portable object owner.

8 Claims, 4 Drawing Sheets

(51) Int. Cl.
    *G06Q 20/32*     (2012.01)
    *G06Q 20/40*     (2012.01)
    *G06Q 20/38*     (2012.01)
    *H04L 29/06*     (2006.01)
    *H04L 9/30*     (2006.01)
    *H04L 9/32*     (2006.01)

(52) U.S. Cl.
    CPC ....... *G06Q 20/3278* (2013.01); *G06Q 20/363* (2013.01); *G06Q 20/3829* (2013.01); *G06Q 20/4014* (2013.01); *H04L 9/30* (2013.01); *H04L 9/3263* (2013.01); *H04L 63/0442* (2013.01); *G06Q 2220/00* (2013.01); *H04L 2209/24* (2013.01)

(56) References Cited

U.S. PATENT DOCUMENTS

| | | | | |
|---|---|---|---|---|
| 5,864,667 | A * | 1/1999 | Barkan | H04L 9/083 380/279 |
| 6,038,551 | A * | 3/2000 | Barlow | G06Q 20/105 235/380 |
| 6,299,062 | B1 * | 10/2001 | Hwang | G06F 21/33 235/379 |
| 6,842,863 | B1 * | 1/2005 | Fox | H04L 9/3263 713/156 |
| 6,885,877 | B1 * | 4/2005 | Ozaki | G06Q 20/06 455/346 |
| 7,287,271 | B1 * | 10/2007 | Riggins | G06Q 20/382 705/64 |
| 7,302,585 | B1 * | 11/2007 | Proudler | G06F 21/84 713/189 |
| 8,041,338 | B2 * | 10/2011 | Chen | G06Q 20/108 455/407 |
| 9,240,884 | B2 * | 1/2016 | Brown | H04L 9/0861 |
| 2002/0026582 | A1 * | 2/2002 | Futamura | H04L 9/3268 713/170 |
| 2002/0032860 | A1 * | 3/2002 | Wheeler | G06Q 20/04 713/170 |
| 2002/0073308 | A1 * | 6/2002 | Benantar | H04L 9/3263 713/155 |
| 2002/0095507 | A1 * | 7/2002 | Jerdonek | H04L 63/12 709/229 |
| 2002/0108041 | A1 * | 8/2002 | Watanabe | H04L 9/3252 713/175 |
| 2003/0145205 | A1 * | 7/2003 | Sarcanin | G06Q 20/02 713/172 |
| 2003/0163700 | A1 * | 8/2003 | Paatero | H04L 63/0823 713/175 |
| 2004/0030887 | A1 * | 2/2004 | Harrisville-Wolff | H04L 63/0442 713/155 |
| 2004/0098352 | A1 * | 5/2004 | Matsuyama | G06Q 20/382 705/71 |
| 2004/0117460 | A1 * | 6/2004 | Walsh | H04L 41/145 709/219 |
| 2004/0268127 | A1 * | 12/2004 | Sahota | H04L 9/0625 713/175 |
| 2005/0021975 | A1 * | 1/2005 | Liu | H04L 63/0281 713/182 |
| 2005/0177518 | A1 * | 8/2005 | Brown | G06Q 20/386 705/64 |
| 2006/0101288 | A1 * | 5/2006 | Smeets | G06F 21/602 713/194 |
| 2009/0143104 | A1 * | 6/2009 | Loh | G06Q 20/32 455/558 |
| 2009/0198618 | A1 * | 8/2009 | Chan | G06Q 20/02 705/66 |
| 2009/0222655 | A1 | 9/2009 | Martinent et al. | |
| 2010/0031025 | A1 * | 2/2010 | Zhang | H04L 63/0823 713/156 |
| 2011/0321127 | A1 * | 12/2011 | Pitroda | G06Q 20/02 726/3 |
| 2012/0101951 | A1 * | 4/2012 | Li | G06Q 20/3223 705/71 |
| 2013/0092741 | A1 | 4/2013 | Loh et al. | |
| 2014/0237256 | A1 * | 8/2014 | Ben Ayed | H04W 12/04 713/186 |
| 2014/0379584 | A1 * | 12/2014 | Ward | G06Q 20/3829 705/71 |

FOREIGN PATENT DOCUMENTS

| | | | | |
|---|---|---|---|---|
| WO | WO-9602993 A2 * | 2/1996 | ............ | H04L 9/3263 |
| WO | WO-0103012 A1 * | 1/2001 | ............ | G06Q 40/00 |
| WO | WO 2007/088203 A2 | 8/2007 | | |
| WO | WO 2009/039419 A1 | 3/2009 | | |

OTHER PUBLICATIONS

European Search Report dated Nov. 3, 2015 in European application 15171811.1, filed on Jun. 12, 2015(with English Translation).

\* cited by examiner

METHOD FOR PROGRAMMING BANKING DATA IN AN INTEGRATED CIRCUIT OF A WATCH

This application claims priority from European Patent Application No. 15171811.1 filed on Jun. 12, 2015, the entire disclosure of which is hereby incorporated herein by reference.

FIELD OF THE INVENTION

The present invention concerns a method for programming confidential or security data, such as banking data, in an application-specific integrated circuit of a portable object, such as a watch, notably in order to effect payment transactions.

The present invention also concerns the portable object, such as a watch, provided with the application-specific integrated circuit for confidential or security data, such as banking data, personalized and programmed in accordance with the programming method.

BACKGROUND OF THE INVENTION

There are known connected portable objects that enable several functions to be performed. Typically, these may be mobile telephones provided with a communication module. The mobile telephone can use several communication protocols, such as the Wifi protocol, the Bluetooth protocol, or the NFC protocol. These mobile telephones may then be used to perform so-called "connected" functions, such as contactless payment, electronic ticketing or contactless access.

For the payment of goods or services, a personalized and secure smart card may also be used as a portable object. The smart card may be provided with means for NFC short-range communication via an antenna with a read device of the place supplying goods or services. Short-range communication using NFC protocol is generally used to perform verification operations on banking data stored in said smart card and the subsequent payment for the desired goods or services.

As shown in FIG. 1, each smart card 1' used for the payment of goods or services, must be personalized during manufacture by a smart card manufacturer 10 recognised and authorised by banking institutions 20. One such recognised card manufacturer is, for example, Oberthur, Gemalto or G & D. The banking data, such as identity credentials or personal identifiers, a bank account number, must be loaded in the smart card in a high security environment.

This banking data is received by the card manufacturer 10 from the bank or from the financial or banking institution 20 of the cardholder. The smart card chip generally has to be certified by Eurocard, Mastercard or Visa at an application-specific chip manufacturer, such as NXP or Infineon, for example. Both the cardholder and the bank are known when the card is manufactured at the manufacturing facility of card manufacturer 10. The banking data is thus loaded in the chip when the card is manufactured at the card manufacturer's facility. Finally, the manufactured card is then transmitted to the cardholder of card 1' with all the identity credentials of the personal banking data.

As illustrated in FIG. 2, another type of connected object may be a watch 1, which may also be used for contactless payment. This watch 1 includes a chip or application-specific integrated circuit for the payment function. The payment chip may be provided by the banking institution 20 and placed on a support, which is then inserted in a specific housing in the product, or a blank chip placed directly inside the product and then programmed by banking institution 20.

The chip may be provided with an NFC short-range communication means or interface in conjunction with an antenna 2 for data reception and transmission. To program said blank chip of watch 1, a symmetric or asymmetric encryption/decryption algorithm can be used for communication with the bank 20 of the account holder whose account is to be programmed in the chip.

In the case of symmetric encryption/decryption, the chip memory may include a set of secret keys. These secret keys are encryption/decryption data, integrity or identification verification data and data to authenticate the external user, which may be the watch. The financial or banking institution 20 immediately authenticates the watch on the basis of authentication data stored in the watch chip. Once the watch has been authenticated, the financial or banking institution 20 encrypts the banking data and verifies the identity references and encryption/decryption data again with a symmetric algorithm (DES or AES). Afterwards, the encrypted data is transmitted to the watch chip.

Since an NFC short-range communication is made by the watch, an intermediate long-range communication terminal must also be used. This communication terminal or means may be a mobile telephone 30, which is disposed at a short distance from the watch for communication using the NFC protocol. The banking data ENC encrypted by bank 20 therefore passes through communication telephone 30 before being received by watch 1. Finally, the chip of watch 1, which received encrypted data ENC, is capable of decrypting and storing data ENC.

One problem in programming the chip with symmetric encryption is knowing how the bank and the watch can share the secret keys. When manufactured, the watch does not yet know the bank. Thus, the keys cannot only be transmitted to the end user bank, but are distributed to all banks, which constitutes a drawback.

In the case of asymmetric encryption/decryption, the chip memory of watch 1 keeps temporary data, which is a private key associated with a public key, which is transmitted to all banks 20. From the bank, an asymmetric encryption and decryption algorithm, for example of the RSA type (from inventors Ronald Revest, Adi Shamir and Leonard Aldelman), can be used. The bank encrypts banking data specific to the bank account holder, with the public key of the chip of watch 1 before transmitting this encrypted data ENC.

Since, as described above, an NFC short-range communication is made by the watch, an intermediate long-range communication terminal must also be used, such as a mobile telephone 30. The banking data encrypted by the bank therefore passes through communication telephone 30 before being received by watch 1. Finally, the chip of watch 1, which received the encrypted data ENC, is capable of decrypting data ENC via its private key and storing the banking data specific to the watch holder in a non-volatile memory. This banking data may also be locked in the chip.

It is to be noted that when asymmetric encryption is used to perform a method for programming banking data in the watch chip, the banks know only the public key, which is advantageous. However, it is necessary to have a database with the public keys for all the watch chips to be personalized. This database may become very large depending on the number of watch chips to be personalized. Further, all the security required for such banking data programming is absent, given that a communication terminal, such as mobile telephone, is used. These are drawbacks.

In a similar vein to the use of asymmetric encryption, mention may be made of CH Patent No. 699 083 B1. In this Patent, there is described a method for digital certificate authentication of a physical object, such as a watch, in order to protect against forgery. The digital certificate is obtained by generating public and private keys stored in a chip for asymmetric encryption. A certification and/or validation authority is also provided to check the authenticity of the luxury watch. However, there is no provision for the secure programming of a watch chip for use in a contactless payment for goods or services.

SUMMARY OF THE INVENTION

It is therefore an object of the invention to overcome the drawbacks of the aforementioned prior art by providing a method for programming confidential or security data, such as banking data, in an application-specific integrated circuit of a watch while guaranteeing total programming security in a non-secure environment. Programming the application-specific integrated circuit of the watch in conjunction with an antenna makes it possible, in particular, to perform payment transactions.

To this end, the invention concerns a method for programming confidential or security data, such as banking data, in an application-specific integrated circuit of a portable object, such as a watch, for which is used an asymmetric encryption/decryption algorithm to perform data programming, wherein the method includes the steps of:
transmitting a public key of the integrated circuit and a digital certificate which is generated by a certification authority on the basis of a private key of the certification authority and of the integrated circuit public key, from the portable object to a bank or a financial or banking institution,
verifying the digital certificate in the bank or the financial or banking institution by means of a public key of the certification authority, and if the digital certificate is validated,
transmitting encrypted confidential or security data, which is personalized to an owner of the portable object from the bank or the financial or banking institution to the portable object, and
decrypting the encrypted data received by the application-specific integrated circuit of the portable object by means of a private key of the integrated circuit, in order to store the decrypted confidential or security data personalized to the owner of the portable object.

Particular steps of the programming method are defined in the dependent claims 2 to 7.

One advantage of the programming method lies in the fact that it enables encrypted data to be transmitted from a financial or banking institution following verification of a digital certificate specific to the integrated circuit and transmitted by the watch to the institution with the public key of said integrated circuit. The encrypted data transmission from the banking institution to the integrated circuit or chip of the watch can pass through a non-secure communication terminal without impairing the unique programming security of the integrated circuit. The integrated circuit can decrypt the encrypted data with its private key, in order to store the data, which means that the watch provided with the application-specific integrated circuit can be used to make a contactless payment for goods or services in short-range communication with an application-specific reader.

Advantageously with this programming method, there is no need to know the entity that transmits the encrypted data, since this data can only be decrypted by means of the watch owner's private key, which is associated with the public key used for data encryption. Further, digital certificate verification is performed in the financial or banking institution using a public key from a certification authority, which generated the digital certificate for the integrated watch circuit on the basis of the private key of the certification authority and the public key of the integrated watch circuit.

It is also an object of the invention to provide a portable object, such as a watch, provided with the application-specific integrated circuit for confidential or security data, such as banking data personalized and programmed according to the programming method.

To this end, the invention concerns a portable object provided with an application-specific integrated circuit for confidential or security data, such as banking data personalized and programmed in accordance with the programming method according to any of the preceding claims, the portable object also comprising an antenna connected to the integrated circuit, which comprises a communication interface for the transmission and reception of data signals, wherein the integrated circuit includes a processor logic unit, an operating system and a memory for storing confidential and security data specific to the owner of the portable object.

Specific embodiments of the portable object are defined in the dependent claims 9 to 12.

BRIEF DESCRIPTION OF THE DRAWINGS

The objects, advantages and features of the method for programming confidential or security data in an application-specific integrated circuit of a portable object, such as a watch, and the portable object provided with said application-specific circuit will appear more clearly in the following description based on at least one non-limiting embodiment illustrated by the drawings, in which.

DETAILED DESCRIPTION OF THE INVENTION

In the following description, all those means used for programming confidential or security data in a portable object, which are well known to those skilled in the art in this technical field, will be described only in a simplified manner. The main emphasis is on the programming of confidential or security data in the chip or integrated circuit of the portable object using an asymmetric encryption and decryption technique.

Figure 1:
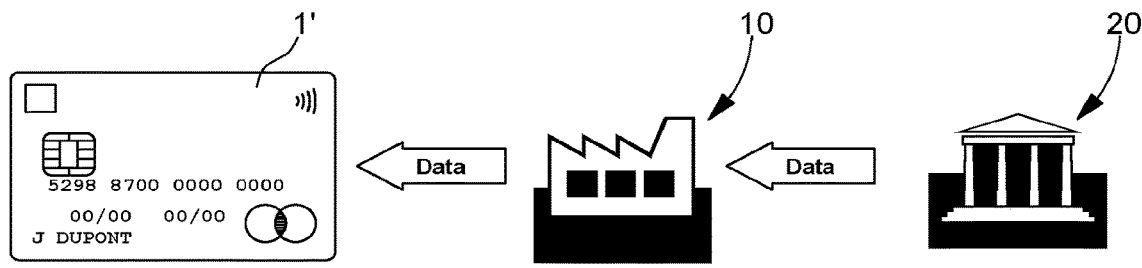
FIG. 1, already cited, schematically represents the standard method for personalising a smartcard with banking data in the prior art.
Figure 2:
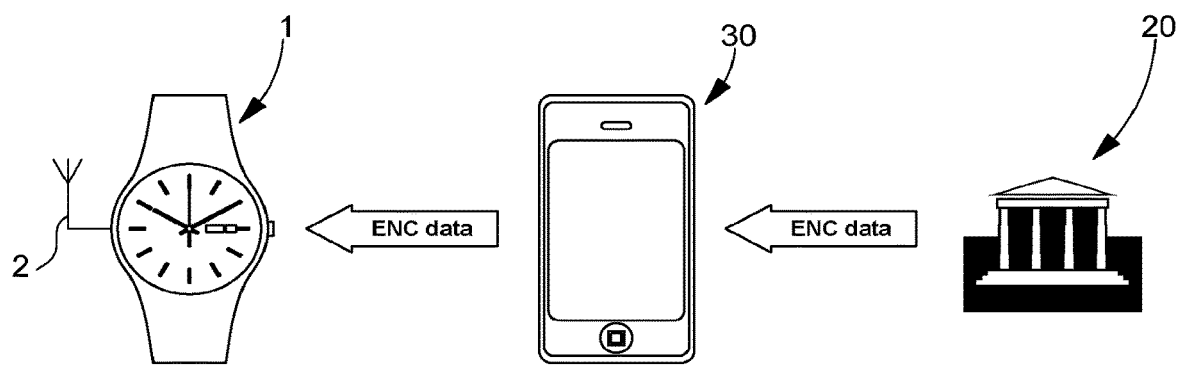
FIG. 2, already cited, schematically represents the standard method for personalising a watch chip with banking data in the prior art.
Figure 3:
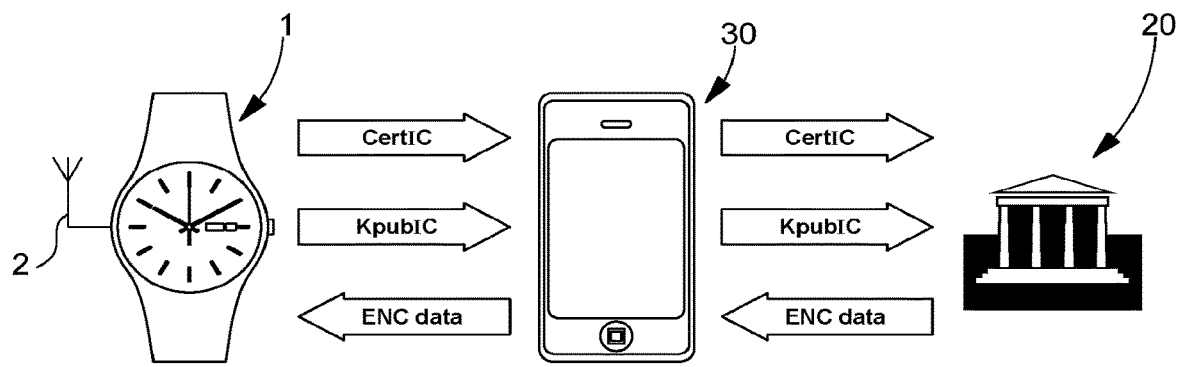
FIG. 3 schematically represents the method for programming an application-specific integrated circuit of a portable object, such as a watch, in a personal manner with confidential or security data, such as banking data from a financial or banking institution according to the invention.

FIG. 3 schematically represents the various elements for programming confidential or security data in an application-specific integrated circuit of the portable object, such as a watch 1. As explained below in more detail with reference to FIGS. 4a, 4b and 5, the chip or application-specific integrated circuit of watch 1 can store, at least temporarily, before programming a private key KprivIC, an associated public key KpubIC and a digital certificate of the circuit CertIC. This digital certificate, like a digital signature, can be generated by a certification authority on the basis of the public key of the watch chip and a private key KprivAC of the certification authority. The certification authority may be the company that manufactured the portable object, notably the watch, for example the Swatch Group.

In order to program confidential or security data, such as banking data, the portable object, such as a watch 1, transmits the digital certificate CertIC and the public key of the integrated circuit KpubIC, via an antenna 2 and using an NFC short-range communication protocol. The antenna may be disposed in the watch case under the watch bezel and include several coaxial coils of diameter close to the diameter of the dial or of the watch case middle.

Since an NFC short-range communication is made from the watch, it has to pass through a long-range terminal or means, such as a mobile telephone 30. This mobile telephone 30 is agnostic and acts as a communication tunnel. Depending on the functions provided in the mobile telephone, a wireless contact may be automatically established with the watch up to a distance of around 30 cm. A communication is also established between mobile telephone 30 and a banking institution 20, where the owner of the portable object may have at least one bank account.

On reception of the digital certificate CertIC specific to the watch, and the integrated circuit public key KpubIC, the financial or banking institution 20 first verifies the digital certificate by means of the certification authority public key KpubAC. If the digital certificate verification is accepted, the public key of the portable object, such as watch 1, is validated. The confidential or security data, notably of the bank account holder, is encrypted by means of public key KpubIC of watch 1, and this encrypted data ENC is transmitted from the financial or banking institution 20. Data ENC is first of all received by mobile telephone 30 before being transmitted via antenna 2 of watch 1, to the application-specific integrated circuit of the watch.

On reception of encrypted data ENC, the application-specific integrated circuit of watch 1 can decrypt data ENC by means of its private key KprivIC stored, at least temporarily, in a memory. The confidential or security data, such as banking data relating to the watch owner's account, can be stored in the memory, preferably in the non-volatile memory, and possibly locked in the memory.

Once the watch owner's personal data is stored in the application-specific integrated circuit, the integrated circuit connected to watch antenna 2 can be used for contactless payments. Contactless payments are made using NFC short-range communication with a reader of a specific location or of a shop selling goods or services. Confidential data verification is performed by means of the reader and through communication with the bank of the owner of watch 1.

It is also to be noted that the public key of the certification authority, for example of the Swatch company, can only be distributed to banks or financial or banking institutions which are partners of the Swatch Group. In such case, the personalized banking data can be sent to watch 1 after manufacture via the intermediate communication terminal, which is the agnostic mobile telephone 30 acting as a communication tunnel.

Other data can also be certified, such as the integrated circuit identification code, which may be EMV certified (Eurocard-MasterCard-Visa). In addition to protecting the banking data of the owner of watch 1, this also makes it possible to identify the application-specific integrated circuit of the watch and, for example, to certify the manufacturer of said integrated circuit. These features ensure that the watch is actually an original Swatch watch. Only the confidential data is in the secure memory of the application-specific integrated circuit of the watch. There is therefore no database that can be hacked.

Figure 4A:
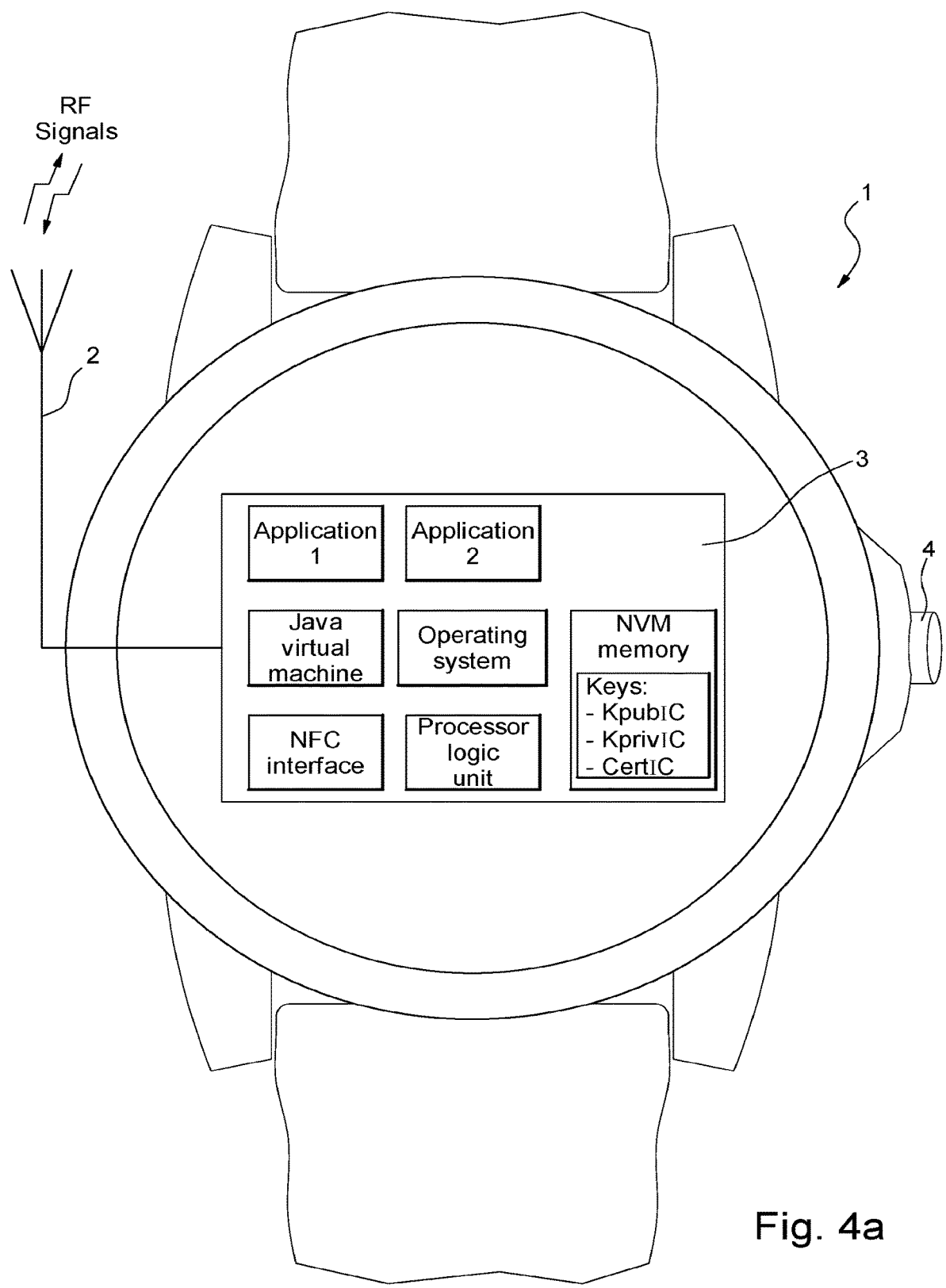
FIGS. 4*a* and 4*b* represent the watch with the application-specific or dedicated integrated circuit for payment transactions before and after the programming obtained using the programming methods of the invention.
Figure 4B:
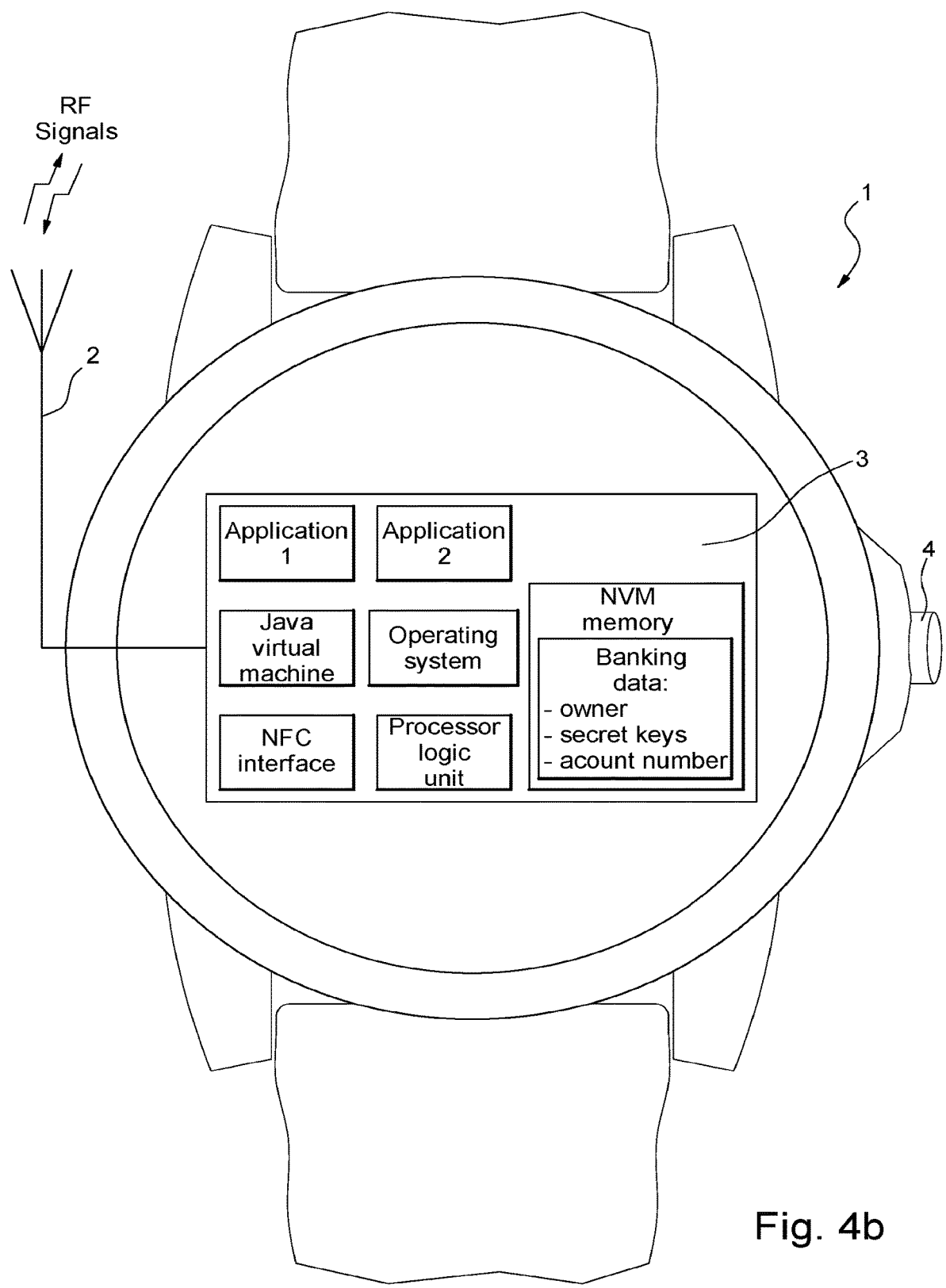

Portable object 1 is represented in a simplified manner in FIGS. 4a and 4b. This portable object is preferably a watch 1. However, it is also possible to envisage having a portable object that is a bracelet, necklace, or even a ring, provided that an owner-specific integrated circuit can be inserted with an NFC short-range communication means.

FIG. 4a shows a simplified top view of a wristwatch 1, in which there is disposed, inside the watch case, an integrated circuit 3, which is not yet personalized to the watch owner. This integrated circuit 3 is connected to an antenna 2 by a well-known NFC communication interface. A push-button 4 or crown may be provided for the conventional setting of the time and date, or to be used to actuate the integrated circuit for an NFC short-range communication. However, the start of communication may also be automatically controlled by a mobile telephone disposed at a short distance.

The integrated circuit may comprise, in a hardware part, an NFC communication interface (RF), a processor logic unit and a memory, which may be a non-volatile memory. The integrated circuit may also comprise in a software part, a Java virtual machine, an operating system, a first banking application, for example Visa, MasterCard or Eurocard, a second banking application and other possible applications. The operating system can implement all the basic software functions, the interface with the hardware part, the management of peripheral devices and of the memory.

It is to be noted that secret keys KpubIC, KprivIC, CertIC specific to the integrated circuit for starting the asymmetric algorithm are stored in the non-volatile memory. These keys are temporarily stored prior to the permanent programming or personalization of the integrated circuit at the end of the programming method according to the invention.

FIG. 4b shows a simplified top view of a wristwatch 1 in which there is disposed, inside the watch case, integrated circuit 3, which is personalized to the watch owner at the end of the programming method according to the invention. Once integrated circuit 3 has received, via antenna 2, the RF signals of encrypted data ENC from the watch owner's bank, data decryption is performed with the stored private key KprivIC. The decrypted confidential or security data can be permanently stored in the non-volatile memory. This confidential data may be the name of the watch owner, his secret keys and his bank account number. It is also possible to envisage deleting the private and public keys and the digital certificate from the memory before locking the confidential data. Once personalized to the watch owner with his banking data, watch 1 with integrated circuit 3 connected to antenna 2, can be used to make contactless payments for products or services by communicating with a reader of a specific place or of a shop.

Figure 5:
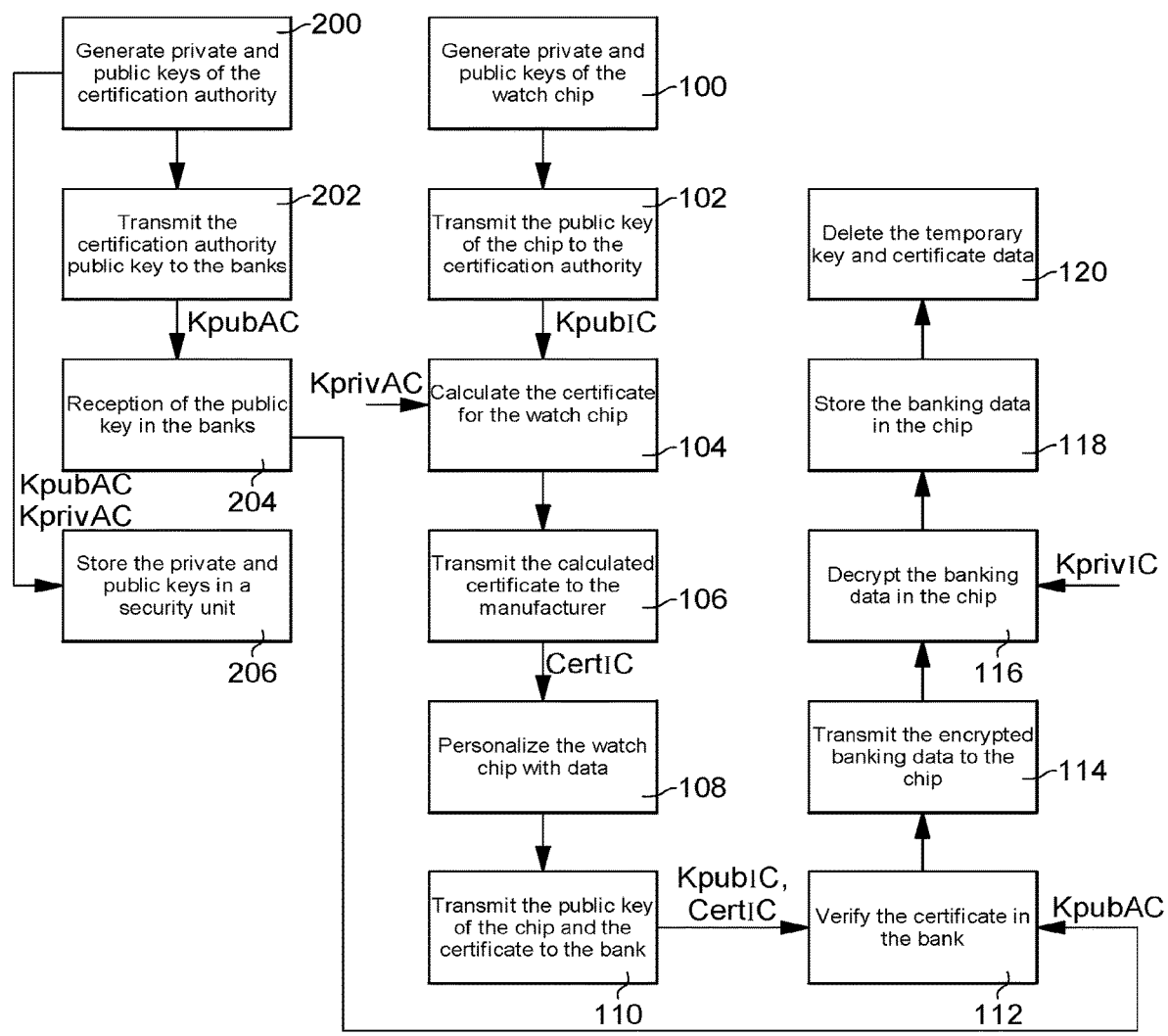
FIG. 5 represents the different steps of the method for programming the application-specific integrated circuit of the watch according to the invention.

FIG. 5 schematically represents the various steps of the method for programming confidential or security data in an application-specific integrated circuit of a portable object, which is preferably a watch 1. Steps 110 to 118 described below constitute the essential steps of the programming method according to the invention and may be sufficient alone to define the scope of the invention.

Prior to programming the application-specific integrated circuit with confidential or security data, there may be provided a step 200 of generating private key KprivAC and public key KpubAC of a certification authority. This certification authority may be, for example, a watch manufacturing company, or an entity of the manufacturing group, such as the Swatch Group. In step 206, once generated, private key KprivAC and public key KpubAC of the certification authority are stored in a security unit, such as a safety deposit box. In step 202, certification authority public key KpubAC is transmitted to the banks, and notably to the banks or financial or banking institutions, which are partners of the Swatch Group. In step 204, the banks or financial or banking institutions receive public key KpubAC which they store in memory.

For the programming of confidential or security data according to the invention, in step 100 a set of private KprivIC and public KpubIC keys of the integrated circuit may be generated. The private and public keys may be generated at the end of the integrated circuit fabrication process or in the manufacturing facility of the portable object, such as the watch. These private and public keys KprivIC and KpubIC are stored, at least temporarily, in an integrated circuit memory, such as a non-volatile memory. These private and public keys are specific to each fabricated integrated circuit and dedicated to a particular use function in the watch.

In step 102, once the private and public keys KprivIC and KpubIC of the integrated circuit are stored, the integrated circuit public key KpubIC is transmitted to the certification authority, such as to a company of the Swatch Group. On reception of public key KpubIC in step 104, a calculation is made of the digital certificate of the integrated circuit on the basis of the certification authority private key KprivAC. The digital certificate is obtained according to the general formula CertIC=F(KpubIC, KprivAC). In step 106, once the integrated circuit digital certificate has been calculated, certificate CertIC is transmitted to the manufacturer of the integrated circuit or of the watch. In step 108, the application-specific integrated circuit is personalized for the manufactured watch. Personalisation consists in storing, at least temporarily, public key KpubIC, private key KprivIC and the integrated circuit digital certificate CertIC of the watch in a memory of the integrated circuit.

In step 110, once the private and public keys KprivIC and KpubIC and certificate CertIC are stored in the integrated circuit, public key KpubIC and digital certificate CertIC are transmitted by the watch antenna in association with the integrated circuit to a bank or to a financial or banking institution. The transmission occurs through a communication terminal, such as a mobile telephone in proximity to the watch, or through a shop system, notably a Swatch shop, where the watch can be purchased by the future watch owner. In step 112, digital certificate CertIC is verified in the bank or financial or banking institution of the owner of the purchased watch, by means of the certification authority public key KpubAC according to the formula V=G(CertIC, KpubAC). If the certificate is validated, the bank or financial or banking institution generates confidential or security data, such as banking data, for the watch to be personalized. This data is encrypted with public key KpubIC received from the integrated circuit according to the formula EncryptedData=H(BankingData, KpubIC).

In step 114, the bank or financial or banking institution transmits the encrypted data to the integrated watch circuit. This encrypted data first passes through the communication terminal acting as a tunnel, before being received by the watch antenna. In step 116, once the encrypted data is received by the integrated circuit, the encrypted data is decrypted with the integrated circuit private key KprivIC. The encrypted data, relating to confidential data of the watch owner, particularly banking data, is stored in the non-volatile memory of the integrated circuit in step 118. This stored data can be locked so that it cannot be destroyed. In a subsequent step 120, the temporary data stored in the integrated circuit memory could be deleted to free memory space.

The programming of confidential or security data may be performed only once with only one transmission and reception from the watch of the public key and the certificate, and of the encrypted data received from the bank. After decryption, the stored confidential data may be locked only once. This can be achieved very quickly after the watch is purchased by the owner while personalising the watch in order to make contactless payments for goods or services thereafter.

From the description that has just been given, several variants of the method for programming confidential or security data in an application-specific integrated circuit of a portable object, such as a watch, and the portable object provided with the integrated circuit programmed according to the method can be devised by those skilled in the art without departing from the scope of the invention defined by the claims. The portable object may also be a bracelet, a ring or a necklace, for example, provided that it is possible to insert the integrated circuit and to establish a short-range communication. The programming of confidential or security data in the integrated circuit of the portable object may also be performed directly at the bank or at the financial or banking institution without using a communication terminal. The confidential or security data may be data other than banking data, so that the portable object can also be used with the application-specific integrated circuit programmed for electronic ticketing or contactless access to a place or rental of a device, such as a vehicle, or for other functions.

What is claimed is:

1. A method for programming confidential or secure data including banking data, in an application-specific integrated circuit of a portable object including a watch, using an asymmetric encryption/decryption algorithm to perform the programming, the method comprising:

storing, by the integrated circuit, a public key and a private key of the integrated circuit, transmitting the public key of the integrated circuit to a certification authority, receiving a digital certificate of the integrated circuit from the certification authority, wherein the digital certificate is generated by the certification authority based on a private key of the certification authority and the public key of the integrated circuit transmitted to the certification authority, transmitting the public key of the integrated circuit and the digital certificate of the integrated circuit from the portable object to a financial or banking institution, wherein the digital certificate is validated by the financial or banking institution using a public key of the certification authority, and when the digital certificate is validated, receiving encrypted confidential or secure data from the financial or banking institution to the portable object, wherein the confidential or secure data is personalized to an owner of the portable object and the encrypted confidential or secure data is encrypted using the public key of the integrated circuit, and decrypting, by the integrated circuit of the portable object, the received encrypted confidential or secure data using the private key of the integrated circuit to store the decrypted received confidential or secure data, and deleting, from the integrated circuit after storing the decrypted confidential or secure data, the private and public key of the integrated circuit and the digital certificate.

2. The programming method according to claim 1, wherein the integrated circuit is connected to an antenna of the portable object for the transmission and reception of data signals with the financial or banking institution of the portable object owner, wherein the transmission of the public key of the integrated circuit and of the digital certificate to the financial or banking institution is via a communication terminal, and the receiving of the encrypted confidential or secure data by the antenna of the portable object from the financial banking institution is via the communication terminal.

3. The programming method according to claim 2, wherein a short-range communication using a near-field communication (NFC) protocol is established between the portable object and the communication terminal, wherein the communication terminal is a mobile telephone acting as a communication tunnel to the financial or banking institution.

4. The programming method according to claim 1, wherein the programming of the integrated circuit, via the storing of the decrypted received confidential or secure data, occurs only one time.

5. The programming method according to claim 1, wherein upon validation of the digital certificate, the financial or banking institution encrypts banking data relating to a bank account of the owner of the portable object.

6. The programming method according to claim 1,
wherein a manufacturer of the integrated circuit or the portable object receives the digital certificate of the integrated circuit from the certification authority and stores the digital certificate in the integrated circuit,
wherein the private and public keys of the integrated circuit are generated during manufacturing of the integrated circuit or the portable object.

7. The programming method according to claim 1, wherein the financial or banking institution stores a public key of the certification authority in a security unit, and the public key and a private key of the certification authority are generated by the certification authority, wherein the public key of the certification authority is used to validate the digital certificate by the financial or banking institution.

8. The programming method according to claim 1, wherein the public key and the private key of the integrated circuit are generated by a manufacturer of the integrated circuit.

\* \* \* \* \*